REMOTE LINE CONCENTRATOR SWITCHING NETWORK

Filed Dec. 16, 1963 7 Sheets-Sheet 1

INVENTORS D. A. KERR
G. F. SWETNAM JR.
BY SE Hollander
ATTORNEY

REMOTE LINE CONCENTRATOR SWITCHING NETWORK

Filed Dec. 16, 1963 7 Sheets-Sheet 2

REMOTE LINE CONCENTRATOR SWITCHING NETWORK

Filed Dec. 16, 1963 7 Sheets-Sheet 4

REMOTE LINE CONCENTRATOR SWITCHING NETWORK

Filed Dec. 16, 1963 7 Sheets-Sheet 5

Nov. 15, 1966 D. A. KERR ETAL 3,286,037

REMOTE LINE CONCENTRATOR SWITCHING NETWORK

Filed Dec. 16, 1963 7 Sheets-Sheet 6

REMOTE LINE CONCENTRATOR SWITCHING NETWORK

United States Patent Office 3,286,037

Patented Nov. 15, 1966

3,286,037

REMOTE LINE CONCENTRATOR SWITCHING NETWORK

Douglas A. Kerr, Springfield, and George F. Swetnam, Jr., Rumson, N.J., assignors to Bell Telephone Laboratories, Incorporated, New York, N.Y., a corporation of New York Filed Dec. 16, 1963, Ser. No. 330,731
15 Claims. (Cl. 179—18)

This invention relates to telephone line concentrators and more particularly to telephone line concentrators including remote switching facilities to operate a plurality of switching stages.

Telephone line concentrators have been employed to extend a relatively larger number of substation lines over a smaller number of trunks to a telephone central office. Since the motivation for line concentration is to reduce the number of telephone lines extending to the office, the possibilities afforded by line concentration at a remote switching unit wherein an illustrative ratio of five lines to each shared trunk to the office is possible is attractive.

However, since the information necessary to establish a particular line-to-trunk connection is often available only at the central office, considerable control data must be transmitted between the central office portion of the concentrator and the remote unit. Thus, for example, on a service request call from a substation at a remote unit it is necessary to select an idle trunk and to deliver information to the remote unit representing the selected idle trunk preparatory to the extension of a connection between the service requesting line and the selected idle trunk at the remote unit.

Since the flexibility of remote switching facilities is related to the number of control steps or phases which govern the stages of switching, it is desirable to include several stages of switching and the control circuitry therefor. However, since the remote unit must be informed over the control paths of the particular crosspoint on each switching stage to be closed, the quantity of information which need be transmitted to operate the control circuitry is literally compounded when there are additional switching stages.

Considering that the over-all motivation for line concentration is to reduce the number of channel pairs extending to the office, any intensification of the quantity of control signal transmission which might necessitate corresponding increases in the number of control channels is partially self-defeative. This situation is seen in even sharper relief when it is recognized that the need for control channel transmission arises out of the use of line concentrators and is unnecessary when using direct-line connections to a telephone central office.

It is therefore an object of this invention to provide for multiple stage switching remote line units wherein the information necessary to operate each of the stages is minimized.

Another object of this invention is to provide for the operation of all of a plurality of control switching units in response to signals conventionally required to operate less than all of the units.

The nature of line concentration at remote locations dictates the ability to perform certain switching functions under remote control which are not ordinarily necessary in conventional direct-connected or central office switching networks. Thus for example, a fault condition on a remote concentrator line is a particularly burdensome difficulty since it is possible for a line which is faulted or exhibits a "permanent" condition thereon to falsely seize an outgoing concentrator trunk to the central office and thereby deny service to other lines which may legitimately originate service requests. Since the lines are coupled on a shared basis to the trunks, the constant pre-emption of a trunk to the central office by a faulted line results in a general degradation of service for the remaining lines.

The effect on the over-all switching system is correspondingly intensified in the case of a faulted line in concentrator operations with respect to a similar faulted line which is direct-connected to the office since in the latter instance only the faulted line itself is, in effect, out of service.

Arrangements are necessary in both direct-connected systems and in concentrator systems for "denying service" to a faulted line in order to relieve the common equipment of the continual false service request indications by the faulted line. In the case of direct-connected lines, convenient arrangements may be made within the central office to disconnect the line relay or other sensory device from the line, thereby denying service to the line temporarily and also freeing the common control equipment for servicing legitimate calls. In the case of a concentrator arrangement, the facilities for denying service must be more intricate since the line itself no longer extends to the office but instead is terminated at the remote switching unit. In consequence, unless a serviceman is dispatched to the remote concentrator location (often a physically inconvenient one, e.g., pole-mounted, vault-enclosed, etc.), facilities must be available for remotely controlling the disconnection of the line from its usual sensory device.

It is therefore an object of this invention to provide for denial of service to faulted lines under control of a central office and without the necessity of dispatching repairmen to the concentrator location.

Another object of this invention is to provide for the denial of service to selected lines in response to the transmission of binary data to the concentrator unit indicative of the selected line.

Still another object of this invention is to provide for the denial of service to concentrator lines without the necessity of transmitting information to the remote unit exclusively for controlling the service denial selector facilities.

In order to verify that line concentrator facilities are continuing to operate satisfactorily, it is sometimes convenient to initiate tests from the central office while the substation lines are in an on-hook condition. Thus, it is useful in some instances to be able to simulate a service request at a particular substation line although the line is in an on-hook condition. Subsequently, the arrival of a service request signal from the remote unit indicative of the identification of the tested line serves to validate the operational integrity of the line equipment and that portion of the concentrator equipment over which the line is extended to the office as well as the control and signaling equipment.

As an illustration, the central office may extend a connection over a particular trunk to the crosspoints in the remote concentrator unit unique to the selected line to be tested in order to operate the line relay of the selected line. Ordinarily, this type of test, although apparently simple and straightforward, would meet with considerable difficulty since it is traditional in telephone switching networks to disconnect the line relay from the substation line when the line is in turn extended over closed crosspoint contacts to a speech channel extending to the office. This arrangement is classical and very nearly universally employed in order to remove the bridging impedance of the substation line relay or other sensory device which might otherwise, during the course of a conversation connection, tend to attenuate or degrade the quality of speech or signal transmission.

It is apparent, however, that the motivation in the proposed test is to operate the line relay over a conventional speech path extending to the office. Thus, the conflict with traditional switching arrangements is clear since the line relay is not ordinarily connected to the substation line when a conventional speech path extends to the office for the reasons just described and is therefore ordinarily unavailable for operation over the test speech path established by the office.

It is therefore another object of this invention to provide for the testing of line relays over a path extending from the central office while the substation associated with the line relay is in the on-hook condition.

It is still another object of this invention to provide for the testing of line relay equipment in response to binary data transmitted to the remote unit from the central office.

These and other objects and features of the invention are achieved in a specific illustrative embodiment in which a group of substations is connectable through a two-stage speech switching network. The two-stage network is in turn energized by a three-step control network which is responsive to binary data transmitted from the office.

As will be seen herein, the barest minimum information required for connecting a particular line to a selected trunk is the identification of the line and the trunk. In the present arrangement which uses ferreed crosspoints in the remote switching network, the simple binary identification of the line and the trunk is sufficient without more and without additional modification or translation to operate upon the control equipment at the remote concentrator to extend a path between the desired line and trunk. It is a significant aspect of this invention that the binary digits indicative of the line include a plural valence with respect to selected ones of the binary digits in order to operate three links of a control network which in turn actuate a two-stage transmission network although no information exclusively related to the identity of the third link is transmitted from the central office.

Thus, the network, having both line and trunk switching stages, is arranged with a line selecting mechanism, a trunk selecting mechanism and a link selecting mechanism wherein the line and trunk selecting mechanisms are directly responsive to the transmission of binary data from the office and, moreover, wherein the link selecting mechanism is also responsive to selected binary digits of the line identification.

A related principle is utilized in the implementation of the service denial technique described above whereby the transmission of the line identification together with binary digits indicative of the appropriate operation of a pair of steering relays is sufficient, not only to energize the line selector circuit of the remote concentrator unit but also to operate a cutoff selector circuit. The latter circuit is also operated without the necessity for the transmission of data exclusively related to that circuit and instead is operative in response to selected digits comprising the binary identification of the line to be denied service.

Moreover, the facilities for performing tests on the line relay equipment is also operative in response only to the transmission of the bare binary identification of the line and the trunk as well as the appropriate information for steering relay operation to connect the appropriate line relay to the selected trunk although the line is in the on-hook condition—a practice which is commonly avoided in conventional telephone switching systems.

A feature of this invention includes a link control switching network operative in response to selected portions of a line identification.

A further feature of this invention includes differentially excited ferreed networks which are coupled in two stages between substation lines and speech trunks.

Still another feature of this invention includes a control link switching network which provides for an effectual three-step coupling between the lines and the trunks without the necessity of transmitting information exclusively for the control of the link switching network.

Still another feature of this invention includes the use of ferreeds in series with the line relays at the remote unit for the controlled connection or disconnection of a line relay from a line in response to the passage of current in a predetermined direction therethrough.

A further feature of this invention includes a plurality of line relays having contacts in a line control switching network and a link control switching network in a manner adapted to provide for flexible operation of all networks without the necessity of transmitting information exclusively for the operation of the latter network.

These and other objects and features of the invention may be more readily comprehended from an examination of the following specification, appended claims and attached drawing in which:

*General description of operation*

Figure 1:
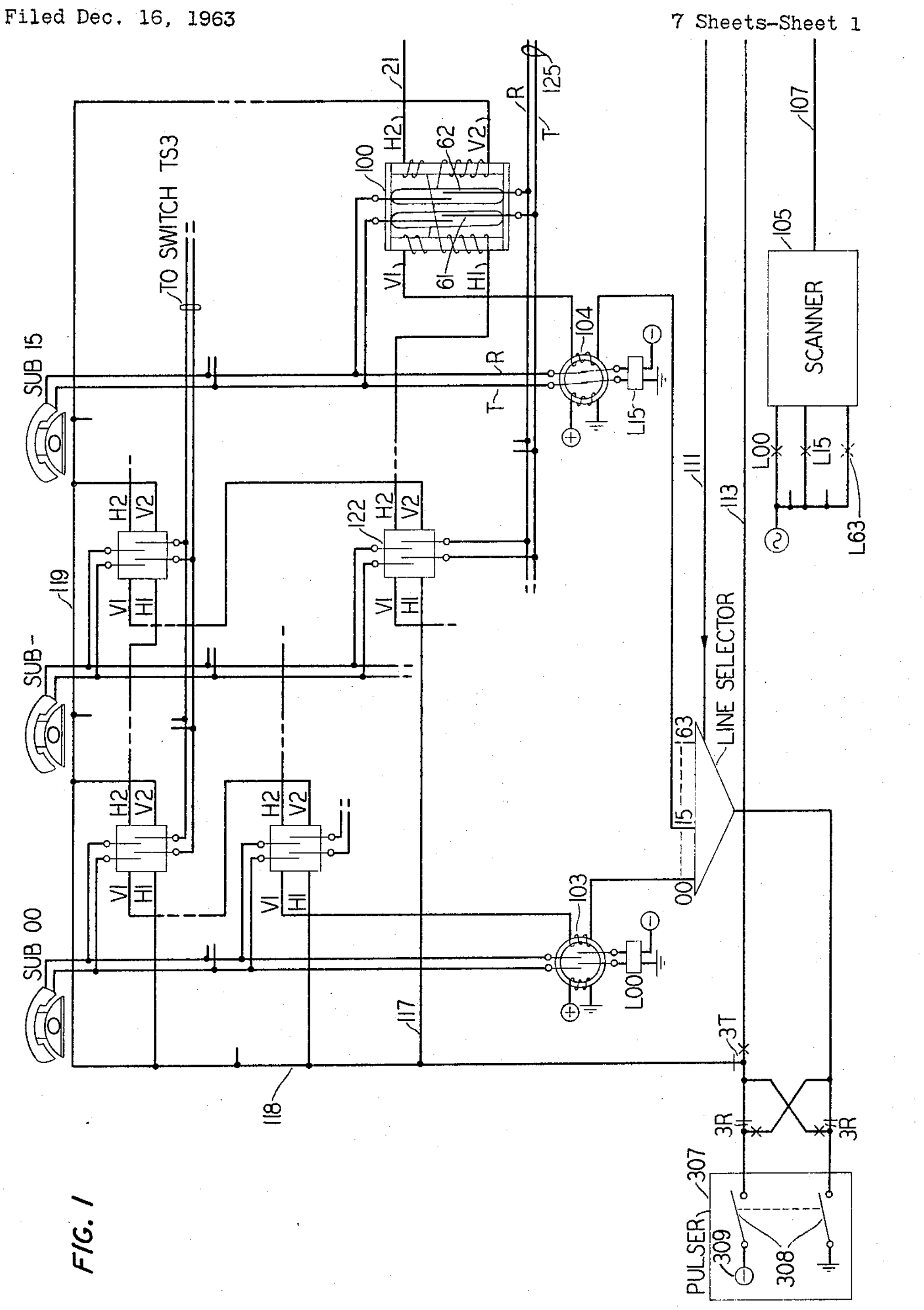
FIGS 1 and 1A show the line selector, trunk selector and link selector in block diagram form and also show the ferreed crosspoints and cutoff ferreeds in partial detail.
Figure 1A:
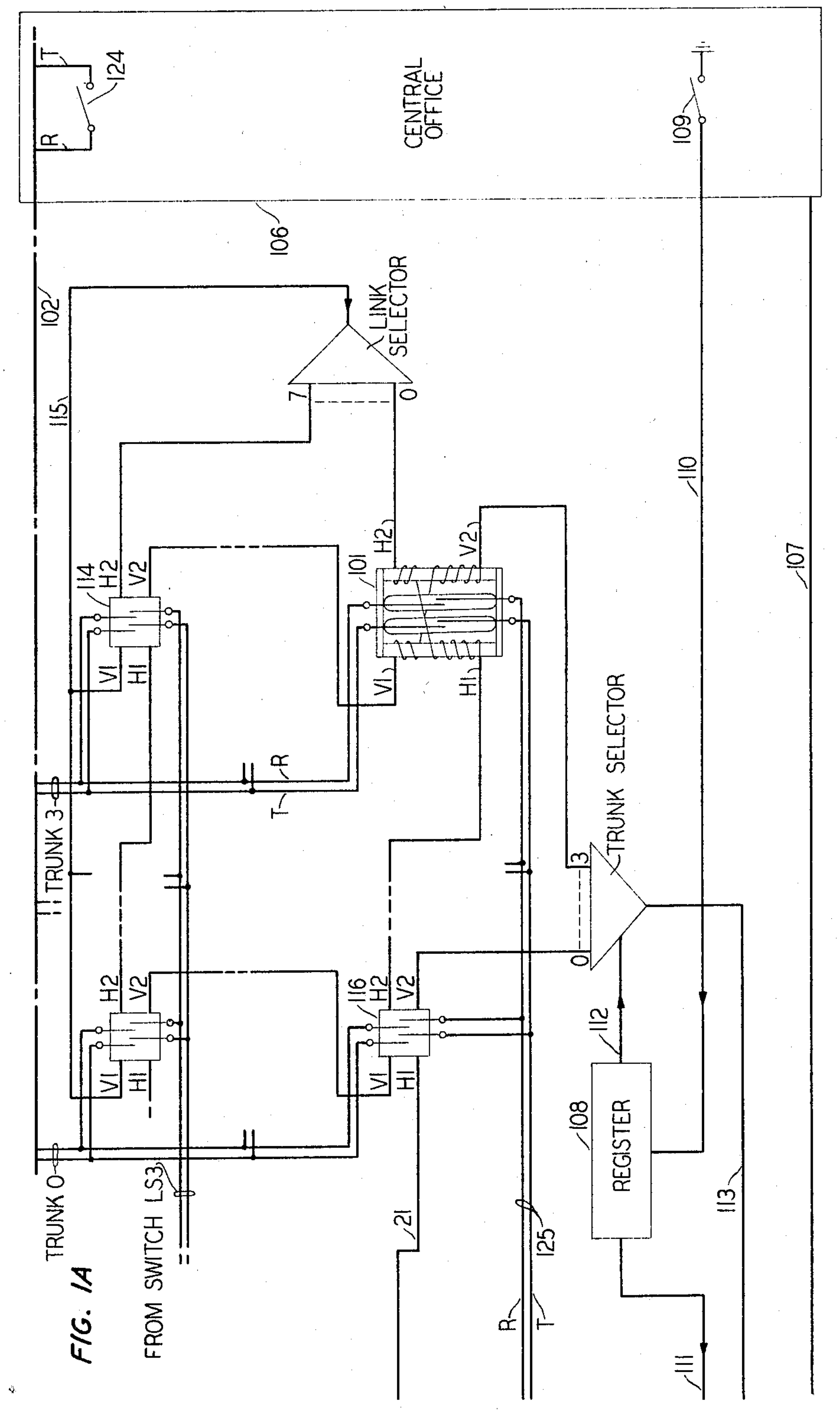
Figure 2:
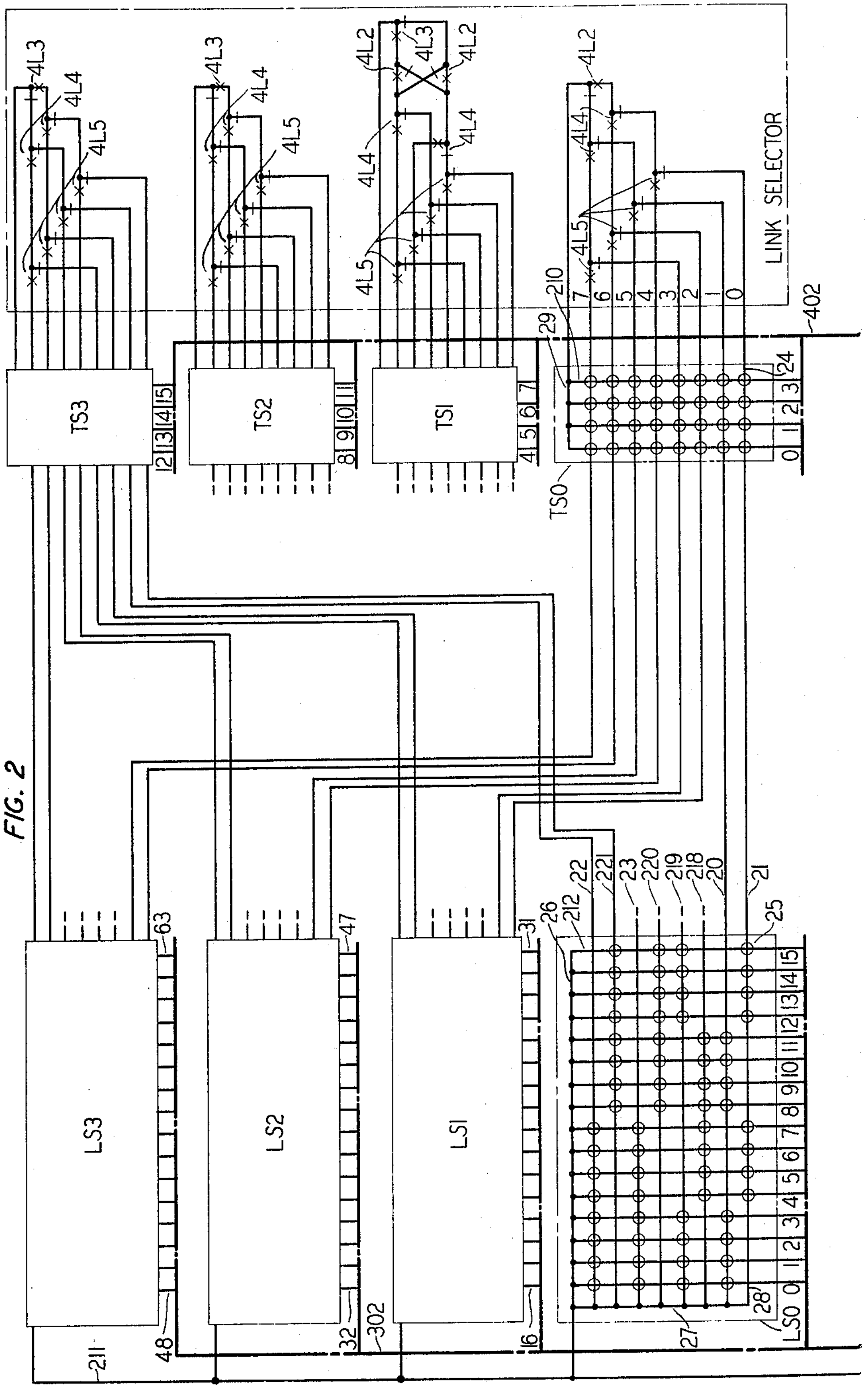
FIGS. 2–4 show the details of the control connections between the line selector, trunk selector and link selector and also show the ferreed crosspoints in outline form.

Referring now to FIGS. 1 and 1A, a generalized or block diagram version of the control circuitry of the instant arrangement is shown. Thus, the line selector, trunk selector and link selector are shown as triangles although they are disclosed in detail in FIGS. 2–4. The speech paths between the substations and the trunks to the central office are shown in FIGS. 1 and 1A, however, and omitted from FIGS. 2–4 for the purpose of clarity. Moreover, ferreeds 100 and 101 show the details of a suitable type of crosspoint for use in the line switch and trunk switch networks of FIG. 2. Thus, each of the circular crosspoint indications, e.g., crosspoint 25 of FIG. 2, is identical to ferreeds 100 or 101 of FIGS. 1 and 1A, respectively. Again, to preserve clarity, the specific ferreeds of FIGS. 1 and 1A are omitted except with respect to ferreeds 100 and 101. It is understood that the windings on the remaining ferreeds in FIGS. 1 and 1A are identical to those which are on ferreeds 100 and 101.

It is seen from FIG. 1 which includes the crosspoints on the line switch network LS0 (of which only a portion is shown) and from FIG. 1A which includes a portion of trunk switch TS0 of FIG. 2 that the substations connected to the line switch may be extended by appropriate crosspoint operation through the trunk switch to the trunks 102 extending to the central office.

Each substation is equipped with a sensory device responsive to line supervisory indications, for example, line relays L00 and L15. These relays are in turn coupled to the line through cutoff ferreeds 103, etc., which serve the function of a cutoff relay in a conventional telephone system. Thus, the contacts of the cutoff ferreed 103 are utilized to disengage the line relay from the line during a conversation connection on the line in order to prevent degradation of speech transmission. The scanner 105 which is responsive to the operation of the line relays includes facilities for transmitting the identification of a line requesting service to the central office 106, shown in FIG. 1A over a control trunk 107. Scanning arrangements of this nature may be seen, for example, in Patent 3,033,937 of W. C. Jones of May 8, 1962, and Patent 3,022,382 of J. C. Ewin of February 20, 1962.

It is a significant aspect of the present arrangement that the transmission of information from the central office to the remote concentrator unit included within FIGS. 1 and 1A is sufficient, without further translation or code conversion, to connect a particular substation to a selected idle trunk. The manner in which this may be accomplished can be demonstrated by an illustration of the operation of the present arrangement during an originating call.

*Connect call*

It will be assumed for purposes of illustration that the subscriber at substation 15 is initiating a cell to a distant substation through central office 106. It is understood that the contacts of cutoff ferreed 104 are normally closed when the substation is on hook and no trouble condition exists. Thus, when the substation 15 goes off hook, the conventional switchhook contacts (not shown) extend a path which may be traced from ground, through line relay L15, contacts of ferreed 104, substation 15, additional contacts of ferreed 104, other winding of relay L15 to negative battery. Under these conditions, relay L15 is operated and the contacts thereof energize scanner 105 to identify the calling substation line and deliver signals indicative thereof over trunk 107 to central office 106 in a manner substantially as described in the above-referred-to patents of J. C. Ewin and W. C. Jones. In response thereto, the central office also in a manner similar to that described in the above-referred-to patents is equipped to transmit signals indicative of the selected idle trunk to which substation 15 should be connected in order to extend a speech connection to the telephone central office.

Figures 4, 5:
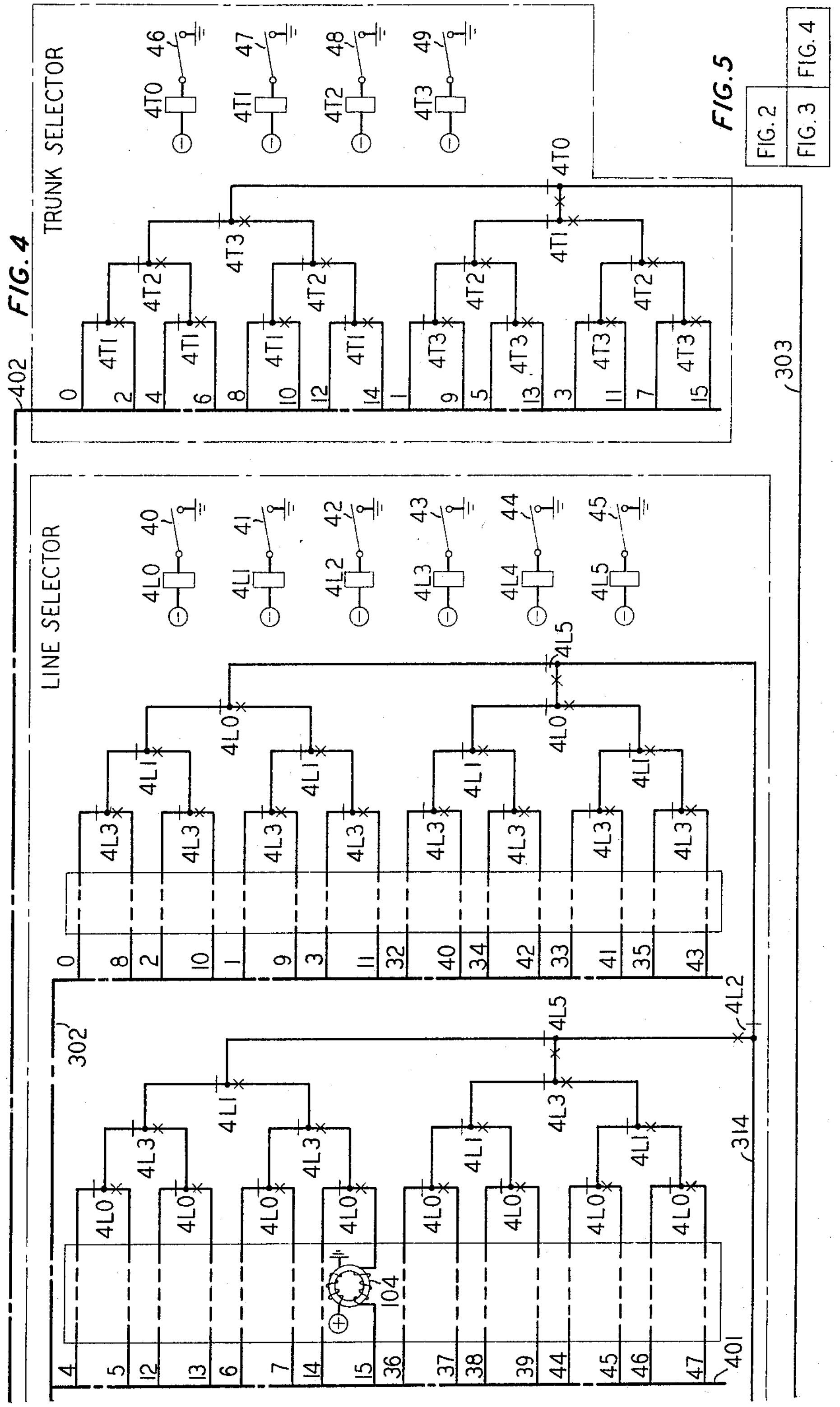
FIG. 5 shows the appropriate disposition of FIGS. 2–4 to disclose the invention.

These signals which in the present arrangement may be constituted exclusively of binary indications indicative of the calling line and selected trunk may illustratively be transmitted over control trunk 110 in accordance with arrangements described in the above-referred-to disclosure of W. C. Jones. The transmission of binary information over the control trunk is shown symbolically by the operation on release of manual switch 109. Thus, the central office may transmit over control trunk 110 to register 108 the binary digits 001111 indicative of line 15 following by the digits 0011 indicative of the trunk 3, and 11 indicative of the operated condition relays 3T and 3R. Register 108 thereupon delivers the information indicative of the selected line to the line selector of FIG. 1 over control conductors 111 and the information indicative of the selected trunk to the trunk selector over control conductor 112. As shown herein, these conditions may illustratively be binary indications adapted to either operate a relay or allow the relay to remain unoperated as seen in FIG. 4.

It is a unique characteristic of the present arrangement that information transmitted from the central office suitable for operating steering relays 3T and 3R, the line selector and the trunk selector alone will, without more, be sufficient for the appropriate operation of the link selector of FIG. 1A. It will be seen, moreover, that subsequent to the operation of the appropriate relays in the line selector, i.e., relays 4L0–4L3 (in the assumed example) of FIG. 4, and the appropriate trunk relays in the trunk selector, i.e., relays 4T0 and 4T1 of FIG. 4, a path will be extended for operating ferreeds 100 and 101 equipped to couple line 15 to the selected trunk, which is illustratively trunk 3. Moreover, the connection between substation 15 and trunk 3 is completed simply by the operation of switches 309 and 308 of pulser 307.

Since the operation involved is a contact function of substation 15 to trunk 3, both steering valves 3R and 3T (the windings of which are not shown in FIG. 1, but shown in detail in FIG. 3) are operated in response to information transmitted from the office. Consequently, a path may be traced from ground, switch 308, contacts (normally open) of relay 3R, contacts (normally open) of relay 3T, conductor 113 to the input terminal of the trunk selector. Thereafter, the path continues over the contacts of relays (not shown, but see FIG. 4) to output terminal 3 of the trunk selector which in turn may be traced to the vertical winding V2 of ferreed crosspoint 101 and subsequently to the vertical winding VI of the same ferreed and, moreover, through the remaining ferreeds in the vertical column of the trunk switch TSO to the vertical winding V2 (not shown) of ferreed crosspoint 114, the vertical winding VI (not shown) of the same ferreed, bus 115 to the input of the link selector. Thereafter, the path may be traced over the contacts of relays (not shown, see FIG. 4) to output terminal 0 of the link selector. The path is further extended to the horizontal winding H2 of the same ferreed crosspoint 101 and the horizontal winding H1 of the ferreed 101 and thereafter through the remaining horizontal windings of the differential ferreeds in the same row of trunk switch TSO to the final ferreed 116 in that row, whereupon the horizontal winding H1 of ferreed 116 extends over conductor 21 to the horizontal winding H2 of ferreed 100 of the line switch. Thereafter, the circuit is extended further through the horizontal winding H1 of ferreed 100 and through the remaining horizontal windings of the ferreeds in the same row (including ferreed 122) and ultimately over conductor 117 to vertical bus 118.

The path continues over horizontal bus 119 to the vertical winding V2 of ferreed 100 and the vertical winding V1 of ferreed 100, the switching winding of cutoff ferreed 104 to the terminal 15 of the line selector. Thereafter, the path continues over the contacts of relays (not shown, see FIG. 4) to the normally open contacts of relay 3R and switch 309 of pulser 307 which is coupled to negative battery.

Under these conditions, the current flow through the horizontal and vertical windings of ferreeds 100 and 101 operates those ferreeds as described in Patent 3,037,085 of T. N. Lowry of May 29, 1962. Similarly, the energization of the remaining ferreeds over only a single winding thereof releases any of those ferreeds which were previously operated. Moreover, the energization of the switching winding of ferreed 104 releases the contacts of that ferreed to disconnect line relay L15 from substation 15.

At this time a speech path may be traced from substation 15 to the office over tip and ring conductors T and R of substation 15, crosspoints of ferreed 100, tip and ring conductors of speech link conductors 125, crosspoints of ferreed 101, tip and ring conductors of trunk 3, cable 102 to the central office.

*Disconnect call*

It will now be assumed for purposes of illustration that it is desirable to disconnect a line from a particular trunk in order to free the trunk for selection on the next service request or terminating call. Again it will be assumed that the line previously connected to the trunk is line 15 and that the trunk is trunk 3. Under these circumstances, the central office will transmit over control conductor 110 the binary signals 001111 indicative of line 15 followed by 00 indicative of the release condition of relays 3R and 3T. Again the register 108 stores the binary data and transmits the equivalent indications to the appropriate relays in the line selector and the trunk selector. Subsequently, upon operation of the switches 308 and 309 in the pulser, a path may be traced from ground, switch 308, normally closed contacts of relay 3R, input to the line selector, contacts (not shown) of relays 4L–, output terminal 15 of the line selector, switching winding of cutoff ferreed 104, vertical winding V1 of ferreed 100, vertical winding V2 of ferreed 100, additional vertical windings of the remaining three ferreeds in the vertical column of switch LS0, horizontal bus 119, vertical bus 118 to conductor O. Thereafter, the path may be traced over the normally closed contacts of relay 3T, normally closed contacts of relay 3R, switch 309 to negative battery.

Since the direction of current flow through the switching winding of ferreed 104 is now in a direction opposite to that previously described for the release of the ferreed, ferreed 104 is again operated thereby linking relay L15 to substation 15 in preparation for subsequent service requests from substation 15. Moreover, it will be noted that the current path included only the vertical windings V1 and V2 of previously operated ferreed 100 and did not include the horizontal windings of the same ferreed. Therefore, in accordance with conventional operation of such ferreeds, as described in the above-referred-to Lowry patent, the ferreed releases.

Thus, the substation 15 is disconnected from the trunk 3 at the contacts of ferreed 100 and is once more reconnected to the line relay L15 in compliance with the commands in the form of binary data transmitted from the office. It will be noted that ferreed 101 remains operated at this time; however, the path over the contacts of ferreed 101 to trunk 3 is open at the contacts of ferreed 100. Moreover, subsequent selection of any other ferreed in the same column or row of trunk switch TS0 of FIG. 1A will result in the automatic release of ferreed 101 in the manner described in the above-referred-to Lowry patent.

*Service denial*

As explained herein in detail, it is occassionally necessary to deny service to a substation in the event, for example, of a fault condition on the substation which generates a false service requiset and would, in consequence, seize a trunk although no call is in effect. To prevent the needless seizure of the trunk, service may be denied to substation 15 in response to the transmission of information representative of the line identity from the central office and the appropriate operation of the steering relays 3T and 3R under those conditions.

Assuming that line 15 is to be denied service, the information transmitted from the central office by the symbolic operation of switch 109 includes only the binary digits 001111 (line 15) followed by the binary digits 10 indicative of the operation of relay 3R and the release of relay 3T. Subsequently, the energization of the pulser 307 by the operation of switches 308 and 309 extends a path which may be traced from ground, switch 308, normally open contacts of relay 3R, normally closed contacts of relay 3T, conductor O, vertical bus 118, horizontal bus 119, vertical winding of the ferreeds (not shown but see FIG. 2) in the same vertical column of line switch LS0 as ferreed 100, vertical winding V2 of ferreed 100, vertical winding V1 of ferreed 100, switching winding of cutoff ferreed 104, terminal 15 of the line selector, contacts (not shown) of relays 4L–, normally open contacts of relay 3R, switch 309 to negative battery.

Since the current flow through the switching winding of cutoff ferreed 104 is in a downward direction, the contacts of ferreed 104 are released thereby disengaging line relay L15 from substation 15. Moreover, since only the vertical windings V1 and V2 of ferreed 100 have been energized (and not the horizontal windings), the ferreed remains in the released condition if originally released and is in fact released if originally operated. Thus, the substation 15 is completely "dead" and service is denied thereto since sensory (line) relay L15 can no longer detect service requests on the substation and since it is not connected to any trunk extending to the office. This completes the execution of the commands transmitted in the form of binary data.

*Service request test*

As indicated herein in detail, it is occasionally desirable to test the operation of the line relays by operating the relays under control of the central office to ascertain whether the scanner 105 is transmitting an appropriate indicating signal to the central office 106.

Under these circumstances, it is necessary to transmit from the central office the line information, trunk information, and the appropriate operation of the steering relays 3R and 3T. Thus, assuming that line 15 is the selected line, and trunk 3 the selected trunk, the following binary data will be transmitted from the office: 001111 indicative of the line 15 followed by 0011 indicative of trunk 3 and 01 indicative of the released condition of relay 3R and the operated condition of relay 3T.

Again, assuming that the information is transmitted over conductor 110 by the symbolic operation of switch 109 in central office 106, the same information is stored in register 108 and transmitted to the appropriate line and trunk relays in the line selector and the trunk selector. Also, assuming that relays 4L5–4L0 correspond in that order to the line information and relays 4T3–4T0 correspond in that order to the trunk information, a path is prepared for the operation of the appropriate crosspoints to effect the connection.

Thus, a path may be traced (upon the operation of switches 308 and 309) from ground, switch 308, normally closed contacts of relay 3R, input to the line selector, contacts (not shown) of relays 4L–, output terminal 15, switching winding of ferreed 104, vertical windings V1 and V2 of ferreed 100, additional vertical windings of the remaining ferreeds (not shown) in the same vertical column as ferreed 100, horizontal bus 119, vertical bus 118, conductor 117, horizontal windings H1 and H2 of ferreed 122, additional horizontal windings of remaining ferreeds (not shown) in the same horizontal row as ferreeds 100 and 122, horizontal windings H1 and H2 of ferreed 100, conductor 21, horizontal windings H1 and H2 of ferreed 116, horizontal windings of additional ferreeds (not shown) in the same horizontal row of trunk switch TS0 as ferreeds 116 and 101, horizontal windings H1 and H2 of ferreed 101, terminal O of the link selector, contacts (not shown) of relays 4L–, horizontal bus 115, vertical windings V1 and V2 of ferreed 114, additional vertical windings of remaining ferreeds (not shown) in the same vertical column of trunk switch TS0, vertical windings V1 and V2 of ferreed 101, terminal 3 of the trunk selector, contacts (not shown) of relays 4T–, conductor 113, normally open contacts of relay 3T, normally closed contacts of relay 3R, switch 309 to negative battery.

It will be noted that the current path through the switching winding of ferreed 104 was in a direction to maintain ferreed 104 in the operated condition. Thus, relay L15 remains connected to substation 15. However, it is assumed that at the time of the proposed test by the central office, substation 15 remains in the on-hook (idle) condition.

Subsequent thereto, appropriate test circuitry indicated symbolically by switch 124 in the central office is closed to extend a complete path from ground, left winding of relay 15, contacts of ferreed 104, tip conductor of substation 15, contacts of ferreed 100, tip conductor of link 125, contacts of ferreed 101, tip conductor of trunk 3, cable 102 to the central office, tip conductor of trunk 3, switch 124, ring conductor of trunk 3, cable 102, ring conductor of trunk 3, contacts of ferreed 101, ring conductor of link 125, contacts of ferreed 100, ring conductor of line 15, contacts of ferreed 104, right winding of relay L15 to negative battery. In consequence, relay L15 is operated in this circuit and the contacts thereof apply a signal to scanner 105 which in turn identifies the line and transmits appropriate data over control conductor 107 to the central office indicative of the operation of line relay L15 in the manner described above. Under these conditions, the central office may verify that the relay for substation 15 is functioning properly.

*Description of major components*

Figure 3:
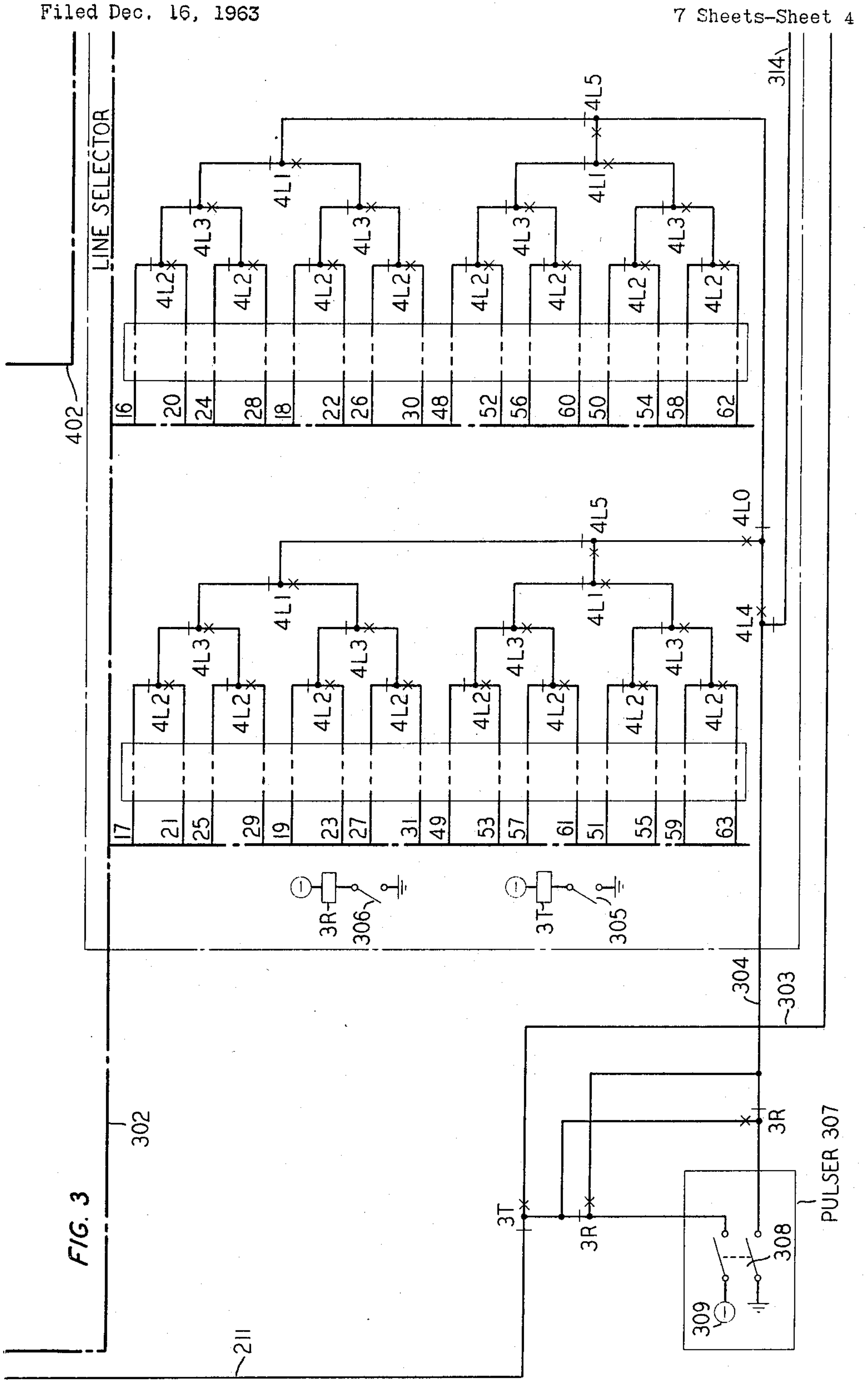

Referring to FIGS. 2, 3 and 4, a network is shown in FIG. 2 for coupling selected lines to idle trunks under control of the line selector and trunk selector of FIGS. 3 and 4. It is a significant aspect of this invention that information delivered to the steering relays 3T and 3R, line selector and trunk selector, exclusively, is sufficient without further information to operate the link selector. This contention is demonstrated graphically by the fact that there are no relays unique to the link selector and, instead, the contacts shown in the link selector are coupled to relays associated with the line selector.

As shown for line switch LS0 of FIG. 2, a plurality of lines, illustratively 64, are connected in groups of 16 to each line switch LS0–LS3. The horizontals of the line switches are connected to links extending in a predetermined pattern to the trunk switches. Thus, illustratively, the lowermost two links, 20 and 21, of line switch LS0 are coupled to the horizontals of trunk switch TS0, the next two (e.g., 218, 219) to trunk switch TS1, and the following two (e.g., 220, 23) to trunk switch TS2. Correspondingly, the upper two levels of line switch LS0 are coupled to links 22 and 221 extending to trunk switch TS3.

Thus, although shown only in part to preserve clarity, the connections between the horizontal multiples of line switches LS0–LS3 and the horizontal multiples of trunk switches TS0–TS3 are symmetrical. The lowest pair of links 20 and 21 extend to the lowest pair of horizontal multiples on trunk switch TS0. Moreover, the lowest pair of horizontal multiples on trunk switches LS1–LS3 are also coupled to corresponding pairs on trunk switch TS0.

The next higher pair of horizontal multiples 218 and 219 of line switch LS0 are coupled to the lowest pair of horizontal multiples on trunk switch TS1. Corresponding pairs on line switches LS1–LS3 are also coupled to trunk switch TS1 in ascending order as shown for trunk switch TS0.

A similar arrangement is shown for the next higher pair of multiples on line switch LS0 coupled to links 23 and 220 which extend to the lowest pair of horizontal multiples on trunk switch TS2. Corresponding horizontal multiples on line switches LS1–LS3 are also coupled to trunk switch TS2 in ascending order as shown for trunk switch TS0. The connections between line switches LS0–LS3 and trunk switch TS3 are shown in detail and follow the same general pattern.

Figure 6:
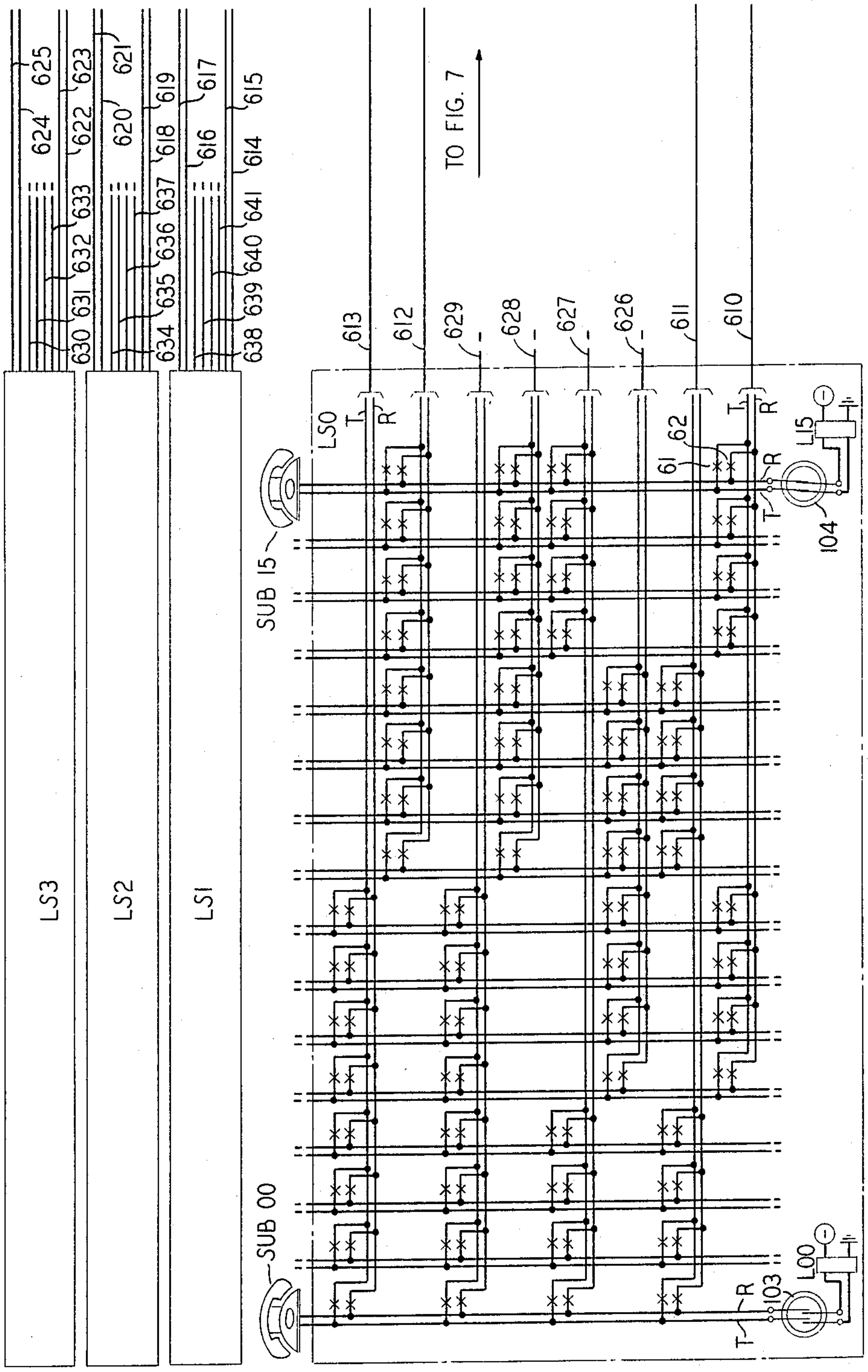
FIGS. 6 and 7 show the details of the speech connections between the line switches and trunk switches.
Figure 7:
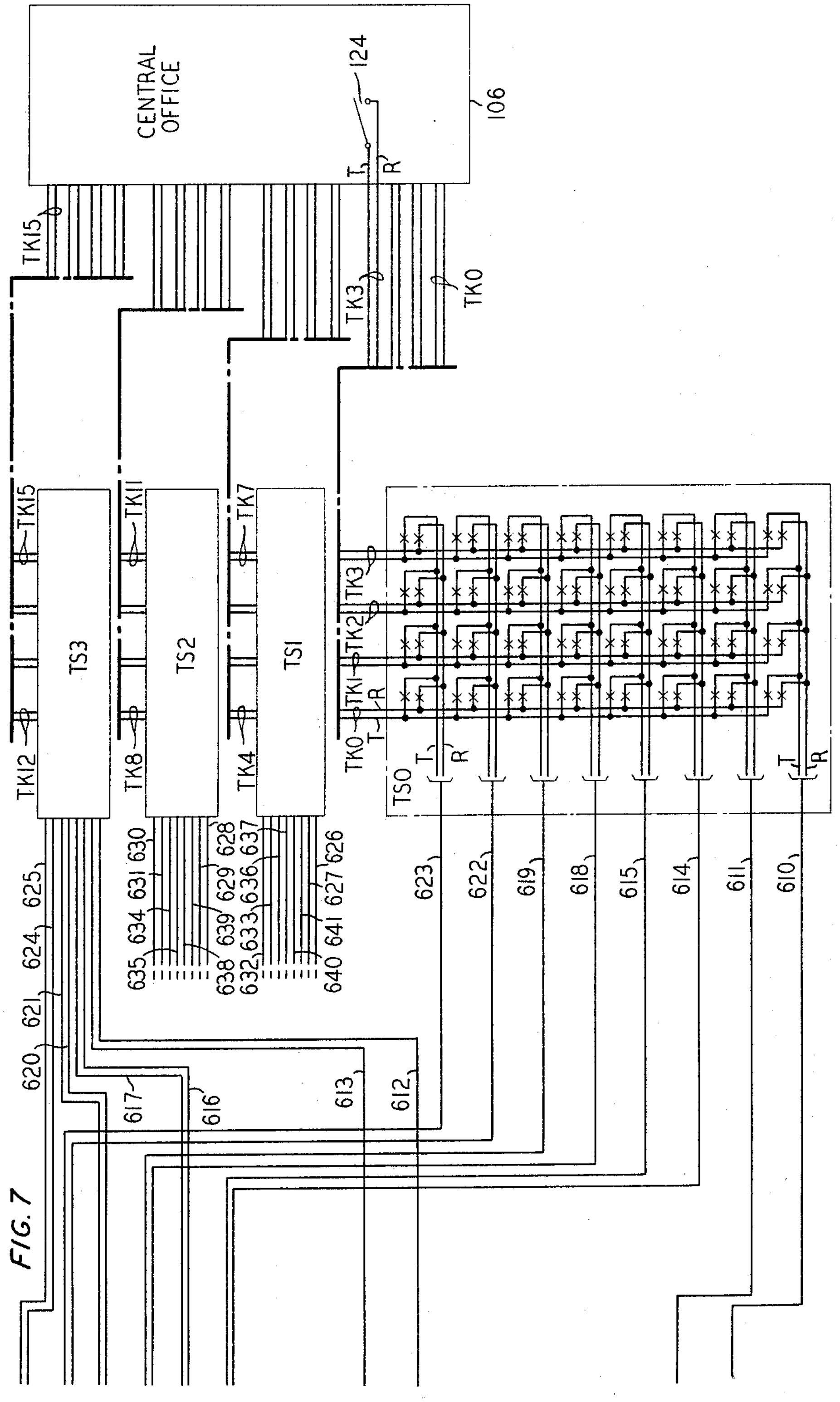

Although the speech paths between the line switches and the trunk switches are shown only in part in FIG. 1, the pattern of connection between the horizontals of the line switches and the horizontals of the trunk switches is identical to that shown for the connections between the control paths as indicated in FIG. 2. In short, each control path, such as control link 21, extending between the horizontal windings of ferreeds 100 and 116 of FIGS. 1 and 1A has a speech link in parallel therewith extending to the lower contacts of the corresponding ferreeds, such as speech link 125 which extends between the lower contacts of ferreeds 100, 116, 101, etc. This pattern is shown in detail for the speech paths in FIGS. 6 and 7 wherein the contacts 61, 62, etc. are the reed contacts of the respective ferreeds.

Thus the lowest pair of speech links 610, 611 extend to the lowest pair of horizontal multiples of switch TS0.

The next higher pair of speech links 626, 627 extend to lowest horizontal multiple of switch TS1. Speech links 628, 629 extend to switch TS2, etc. Correspondingly numbered links in FIGS. 6 and 7 indicate the relative interconnections of the speech paths between the link switches LS0–LS3 and the trunk switches TS0–TS3.

For clarity of presentation, the details of the crosspoint facilities at each of the crosspoints in the line and trunk switches is omitted but shown instead in FIG. 1.

Thus, ferreed switch 10 of FIG. 1 indicates an illustrative crosspoint contact arrangement suitable for use in combination with the present invention. Ferreed 10 therefore represents the crosspoint shown symbolically by each circle for line switch LS0. Similarly, ferreed 11 represents the crosspoint shown symbolically by each circle in the trunk switch TS0.

The conductors shown in FIG. 2 are coupled to the control windings H1, H2, V1, V2 of each of the ferreed crosspoints. The actual speech conductors T and R are omitted for clarity, but the manner of their arrangement is shown in FIG. 1.

The line selector of FIGS. 3 and 4 includes a modified "tree" arrangement having a single input from the pulser of FIG. 3 and the path through the tree is determined by the operation of relays 4L0–4L5. The 64 distinct outputs from the tree, all of which are shown in FIGS. 3 and 4, are respectively coupled to the control conductors 0–63 on the verticals of the line switches LS0–LS3. Similarly, the 16 outputs from the trunk selector of FIG. 4 are energized in accordance with the operation of relays 4T0–4T3 and in turn are coupled to the verticals of the trunk switches TS0–TS3.

The over-all manner of the configuration of the ferreed networks of FIG. 2 including the interrelationship of the windings of the ferreeds is shown in detail in Patent 3,037,085 of T. N. Lowry of May 29, 1962.

It will be noted that the link selector of FIG. 2 is also a modified form of tree arrangement wherein the contacts are operated by the relays of the line selector.

*Detailed description of operation—Connect call*

It will be assumed for purposes of operation that a substation coupled to line 15 is to be connected to trunk 3 in consequence of an originating call from line 15 or a terminating call to that line. The facilities for selecting a trunk which is idle for connection to the line are not shown herein as unessential to an understanding of the present invention but may illustratively follow procedures utilized in Patent 3,022,382 of J. C. Ewin of February 20, 1962. Under these conditions, the central office, after having selected the idle trunk—in this case assumed to be trunk 3—and being apprised of the line identity which has been assumed to be 15, transmits binary data indicative of the selected line as well as data indicative of the trunk and the function to be performed.

For clarity of presentation, the manner of operation of the line and trunk selector relays as well as the steering relays 3T and 3R are shown symbolically as being operated by manual switches, although it is understood by those skilled in the art that conventional reception and translation facilities (for example, those disclosed in the Ewin and Jones patents) may be utilized for converting the information transmitted by the office to electrical indications appropriate for operating the respective relays.

In the assumed example, the binary data transmitted for the line designation would include the binary digits 001111 representative of line 15, binary digits 0011 representative of line 3, and binary digits 11 indicative of the operation of both relays 3T and 3R. In consequence, relays 4L0–4L3 will be operated, as shown symbolically, by manual switches 40–43 and relays 4T0 and 4T1 will be operated by manual switches 46 and 47. Similarly, relays 3T and 3R will both be operated, as shown symbolically, by manual switches 305 and 306. Thereafter, the pulser 307 is operated by switch 308 to close the appropriate crosspoints for coupling the selected line 15 to the selected trunk 3. Moreover, the cutoff ferreed 15, shown in FIG. 4 in series with output conductor 15 from the line selector, is operated to disconnect the line relay L15 from the subscriber loop. At this time, a path may be traced for the energization of crosspoint 25 in line switch LS0 and crosspoint 24 in trunk switch TS0 to couple line 15 to trunk 3 in the manner shown in FIG. 1.

This control path may be traced in detail from negative battery, switch 309, normally open contacts of relay 3R, conductor 304, normally closed contacts of relay 4L4, conductor 314, normally open contacts of relay 4L2, normally closed contacts of relay 4L5, normally open contacts of relays 4L1, 4L3 and 4L0 through the cutoff ferreed 104, cable 401, cable 302, input conductor 15, crosspoint 25, additional crosspoints on the vertical multiple for conductor 15, horizontal bus 26, vertical bus 27, horizontal multiple 28, crosspoints on the horizontal multiple, again through crosspoint 25 and over link 21 to trunk switch TS0. The path continues through crosspoints on the horizontal multiple, crosspoint 24, normally closed contacts of relays 4L5, 4L4, 4L2, horizontal bus 29 of trunk switch TS0, vertical multiple 210 of trunk switch TS0, crosspoint contacts on the vertical multiple, crosspoint 24, output conductor 3 of trunk switch TS0, cable 402, conductor 3, normally closed contacts of relays 4T3, 4T2, normally open contacts of relays 4T1, 4T0, conductor 303, normally open contacts of relays 3T and 3R, switch 308 to ground to complete the series path.

As explained heretofore for FIG. 1, the differential excitation of the ferreeds at the crosspoints 25 of the line switch and 24 of the trunk switch result in the operation of the ferreed contacts thereat to couple line 15 to trunk 3. Moreover, the operation of cutoff ferreed 15 results in the decoupling of the line relay L15 associated with line 15 from the line itself as depicted in FIG. 1.

Thus, the network has executed the order which dictated the coupling of line 15 to trunk 3 and the disconnection of the line relay L15 in response to the binary data indicative of the line, the trunk and the operation of the steering relays.

*Detailed description—Disconnect call*

It will be assumed that the substation coupled to line 15 in the preceding example has returned to the on-hook condition and it is now necessary to connect the line relay to the line once more by operating the cutoff ferreed 104 in FIG. 4 unique to line 15.

Under these conditions, the central office transmits only the line identity and binary signals indicative of the necessity to release both relays 3R and 3T. This data may take the form of binary digits representative of line 15, i.e., the digits 001111 and data indicative of the steering relay operation, i.e., 00. As described above, this information may be translated by well-known equipment to effect the operation of relays 4L0–4L3 of the line selector, as shown symbolically, by the operation of relays 40–43 and the release of relays 3T and 3R, as shown symbolically, by switches 305 and 306. Thereafter, the operation of switch 308 extends a connection from negative battery, normally closed contacts of relays 3R and 3T, contacts of relays 4L4, 4L5, cable 211, conductor O, horizontal bus 26 of line switch LS0, vertical multiple 212, crosspoints on the vertical multiple, crosspoint 25, conductor 15, cable 302, conductor 15, cutoff ferreed 104 in series with conductor 15, normally open contacts of relay 4L0, 4L3, 4L1, normally closed contacts of relay 4L5, normally open contacts of relay 4L2, conductor 314, normally closed contacts of relay 4L4, conductor 304, normally closed contacts of relay 3R, switch 308 to ground, to complete the path.

As explained above in the description for FIGS. 1 and 1A, currrent flow through crosspoint 25, as a result of current on only the vertical multiple (or the horizontal multiple) releases the ferreed contacts. Moreover, it will be noted that in view of the operation of relays 3T and 3R, the current flow through cutoff ferreed 104, in series with conductor 15 of FIG. 4, is in a direction opposite to that described in the preceding section for the release of the cutoff ferreed. In consequence, the cutoff ferreed is once more operated to couple the line relay associated with line 15 to the substation loop as shown in FIG. 1.

At this time the order which dictated the disconnection of line 15 from trunk 3 and the reconnection of the line relay to the line has been executed.

*Detailed description—Service denial*

It will now be assumed that it is necessary to deny service to a particular line. A requirement of this nature may be necessary, for example, in view of a fault condition on the line which generates a false service request condition. To avoid unnecessary seizure of common equipment, the line may be denied service until the fault condition is corrected. Here again, it will be assumed that the line is line 15 and has remained connected to trunk 3 as part of a delayed disconnect concentrator system in which a number of lines remain connected through to trunks at all times although the lines are on-hook. This type of operation is described in detail in the above-referred-to patent disclosure of J. C. Ewin.

Again, under these conditions, the office need transmit only the binary data representative of the line identity and the condition of the steering relays 3T and 3R connected to the pulser 307. Since the line identity is 15, the binary digits 001111 are transmitted as well as the digits 10 representative of an operated relay 3R and released relay 3T. As described above, the appropriate relays 4L0–4L3 are responsive to the transmitted binary data, as shown symbolically, by the operation of switches 40–43 and relay 3T is released and relay 3R operated by switches 305 and 306, respectively.

Subsequently, switch 308 is momentarily closed and a path may be traced from source 309, normally open contacts of relay 3R, conductor 304, normally closed contacts of relay 4L4, conductor 314, normally open contacts of relay 4L2, normally closed contacts of relay 4L5, normally open contacts of relays 4L1, 4L3, 4L0, cutoff ferreed 104 in series with conductor 15, cable 401, cable 302, conductor 15, crosspoint 25, additional crosspoints in vertical multiple 212, horizontal bus 26, conductor O, conductor 211, normally closed contacts of relay 3T, normally open contacts of relay 3R, switch 308 to ground.

As indicated above in the description of FIG. 1, current flow through crosspoint 25, as a result of current through the vertical multiple alone, releases the ferreed contacts to disconnect line 15 from link 21 and therefore from trunk 3. It will be noted that the direction of current flow through the cutoff ferreed 104 is in the same direction as that described above for the connect function and therefore the ferreed contacts are released to disconnect the line relay associated with line 15 from the line.

In consequence, line 15 is electrically disconnected from its own line relay and, moreover, is disconnected from any trunk to the office which renders line 15 a "dead" line, i.e., no sidetone and no dial tone to completely deny service to that line as dictated by the order originally transmitted from the office.

*Detailed description—Service request test*

Under certain conditions, it is useful to be able to perform a service request test by coupling a line relay across a customer's line while at the same time effecting a connection to the line by a trunk to the central office. It will be noted, of course, that this condition is antithetical to conventional operations wherein the line relay is customarily disconnected from the line when a line-to-trunk connection is effected to remove the bridge thereacross which might otherwise degrade transmission.

However, under the test conditions in which the line relay is bridged across the line and a trunk connection is nevertheless effected, the central office may transmit current through the trunk to operate the line relay and observe if a service request is obtained from the line.

The data for accomplishing this function includes the transmission of line and trunk identities as well as the steering relay conditions. Again, assuming that line 15 is to be connected to trunk 3, the binary digits representative thereof, i.e., 001111 for line 15 and 0011 for trunk 3, are transmitted as well as the digits 01 representative of a released relay 3R and an operated relay 3T.

As described above, the symbolic switches 40–43, 46 and 47 are operated in response to the transmitted data and, moreover, relay 3R is released by switch 306 and relay 3T is operated by switch 305.

Subsequently, the momentary operation of switch 308 extends a path from pulse source 309 over normally closed contacts of relay 3R, normally open contacts of relay 3T, conductor 303, normally open contacts of relays 4T0, 4T1, normally closed contacts of relays 4T2, 4T3, output conductor 3, cable 402, conductor 3, crosspoint 24, additional crosspoints in vertical multiple 210, horizontal bus 29, normally open contacts of relay 4L2, normally closed contacts of relays 4L4, 4L5, horizontal multiple associated with crosspoint 24, additional crosspoints on the horizontal multiple, link 21, crosspoint 25 of line switch LS0, additional crosspoints in horizontal multiple 28, vertical bus 27, horizontal bus 26, vertical multiple 212, crosspoints on the vertical multiple, crosspoint 25, conductor 15, cable 302, cable 401, conductor 15, cutoff ferreed 104, normally open contacts of relays 4L0, 4L3, 4L1, normally closed contacts of relay 4L5, normally open contacts of relay 4L2, conductor 314, normally closed contacts of relay 4L4, conductor 304, normally closed contacts of relay 3R, switch 308 to ground.

Under these conditions, crosspoints 25 and 24 experience current flow in the horizontal and vertical multiples thereof and, in consequence, operate their contacts, as shown in FIG. 1, to couple line 15 with trunk 3. In addition, the direction of current flow through cutoff ferreed 104 is again in a direction to operate the cutoff ferreed contacts and, in consequence, the line relay associated with line 15 remains connected to the line although the line is now connected to a trunk. At this time a signal may be delivered from the central office over the trunk tip and ring to operate the line relay as shown in FIG. 1 and thereafter effect a line service request signal to the office if indeed the line relay is functioning properly, all as required by the order from the central office, which has now been executed.

It is to be understood that the above-described arrangements are illustrative of the application of the principles of the invention. Numerous other arrangements may be devised by those skilled in the art without departing from the spirit and scope of the invention.

What is claimed is:

1. A switching network for a remote telephone line concentrator including line switching means; trunk switching means; a plurality of links coupling said line switching means to said trunk switching means; line selector means, trunk selector means and link selector means for respectively controlling said line switching means, trunk switching means and the selection of a particular link between said line switching means and trunk switching means; means in said line selector means and said trunk selector means effective in response to the reception of particular binary code signals indicative of a selected line and trunk for operating said line switching means and trunk switching means to interconnect said line and trunk; and additional means in said link selector means responsive to selected portions of said binary code signals indicative of said selected line for selecting a link between said line switching means and said trunk switching means.

2. A switching network for a remote line concentrator in accordance with claim 1 wherein said line switching means and said trunk switching means include a coordinate array of differential ferreeds, said ferreeds having horizontal and vertical windings thereon, means for coupling said line selector means to selected vertical windings of said line switching means, means for connecting said vertical windings of said trunk switching means to said trunk selector means, and means for interconnecting said horizontal windings of said ferreeds in said line switching means and said trunk switching means over said links.

3. A switching network for a remote telephone line concentrator including a line switching matrix, a trunk switching matrix, a plurality of links for interconnecting said matrices, line selector means and trunk selector means for respectively controlling said line and trunk matrices, link selector means for energizing particular links to be utilized in interconnecting said matrices, relay means in said line selector means and trunk selector means responsive to the reception of binary data indicative of a particular line and trunk for controlling said line and trunk matrices preparatory to the interconnection of said line and trunk, and means in said link selector means including contracts in said relay now in said line selector means responsive to the reception of binary information indicative of said selected line for energizing a particular link interconnecting said line and trunk.

4. A switching network for a remote telephone line concentrator including a first and second speech transmission switching stage, first, second and third selector means, means responsive to the transmission of binary information representative of a line identification and a trunk identification for governing said first and second selector means to control said first transmission stage and said second transmission stage, and additional means responsive to the transmission of binary information representative of selected portions of said line identification for energizing said third selector means to jointly control said second transmission switching stage.

5. A telephone line concentrator system including line switching means; trunk switching means; line selector means for controlling said line switching means, and link selector and trunk selector means for controlling said trunk switching means; means responsive to the transmission of binary information representative of a particular line identification for controlling said line selector means to energize the operation of said line switching means, means responsive to the reception of binary information representative of a particular trunk identification for controlling said trunk selector means for partially energizing said trunk switching means, and additional means responsive to selected portions of said binary line identification information for controlling said link selector means to complete the energization of said trunk switching means.

6. A telephone line concentrator system including a telephone central office, a plurality of lines, a smaller plurality of trunks extending from said office, line switching means and trunk switching means for coupling said lines to said trunks, line selector means for controlling said line switching means, link selector means and trunk selector means for controlling said trunk switching means, means responsive to a calling condition on one of said lines for extending a connection between said line and a selected idle trunk including means responsive to the reception of binary indicia representative of said idle trunk identification for governing said trunk selector means, additional means responsive to said indicia representative of said line identification for governing said line selector means to control said line switching means and means responsive to selected portions of said indicia representative of said line identification for governing said link selector means.

7. A telephone line concentrator system including a telephone central office, a plurality of remote telephone lines, a plurality of trunks extending from said office, line switching means and trunk switching means for extending speech channels between said lines and said trunks, line selector means for controlling said line switching means, link selector and trunk selector means for controlling said trunk switching means, means responsive to the reception of binary indicia representative of a trunk disconnect indication and a particular line identification for energizing said line selector means to control said line switching means for disconnecting said particular line from said trunk to be disconnected, line sensory means, line cutoff means, additional means responsive to said line identification indicia for controlling said line cutoff means to connect said line sensory means to said line and means including said link selector means and trunk selector means for controlling said trunk switching means to maintain a connection to said trunk.

8. A telephone line concentrator system including a plurality of remote substation lines, a telephone central office, a smaller plurality of trunks extending from said office, line switching means and trunk switching means for interconnecting selected lines and trunks, line selector means for controlling said line switching means, link selector and trunk selector means for controlling said trunk switching means, means responsive to the reception of binary digits indicative of a particular line to be denied service for energizing said line selector means to control said line switching means to disconnect said line from all of said trunks, line sensory means connected to said line, line cutoff means, steering means, means responsive to the reception of additional binary signals indicative of the operation of said steering means for controlling said line cutoff means to disconnect said line sensory means from said line to be denied service, and additional means including said steering means for inhibiting the operation of said link selector means and trunk selector means.

9. A telephone line concentrator system including a telephone central office, a plurality of remote substation lines, a smaller plurality of trunks extending from said office, line switching means and trunk switching means for coupling said lines to said trunks under control of said office, line selector means for controlling said line switching means, link selector means and trunk selector means for controlling said trunk switching means, steering means, means responsive to the reception of binary signals representative of a particular line for governing said line selector means to control said line switching means, means responsive to the reception of binary signals representative of a selected idle trunk for governing said trunk selector means controlling said trunk switching means to couple said particular line to said selected trunk, and additional means responsive to the reception of portions of said line identification for governing said link selector means for jointly controlling said trunk switching means, line sensory means, line cutoff means, and additional means responsive to the reception of binary signals indicative of the operation of said steering means for controlling said cutoff means to connect said line sensory means to said particular line and to said selected trunk extending to said office for testing the operation of said line sensory means.

10. A telephone line concentrator system including a telephone central office, a plurality of remote substation lines, a plurality of trunks extending from said office, line switching means and trunk switching means for coupling said lines to said trunks, a plurality of links interconnecting said line switching means and said trunk switching means, line selector means for controlling the operation of said line switching means, trunk selector means for controlling the operation of said trunk switching means, link selector means for controlling the operation of said trunk switching means in selecting a particular link to said line switching means, means responsive to the reception of binary indicia representative of a particular line identification for energizing said line selector means to control said line switching means, means responsive to the reception of binary indicia representative of a particular trunk identification for governing said trunk selector means to control said trunk switching means, and additional means responsive to the reception of selected portions of said line identification indicia for governing said link selector means to jointly control said trunk switching means to establish a speech transmission connection between said line and said trunk over said particular link.

11. A telephone line concentrator system in accordance with claim 10 wherein said line switching means includes a coordinate array of horizontal and vertical conductive paths having ferreed crosspoints at selected intersections of said paths in accordance with a binary code representative of particular line identifications, wherein said trunk switching means includes a plurality of horizontal and vertical conductive paths having ferreed crosspoints at the intersections of said paths, and wherein said links are connected between said horizontal paths of said line switching means and said trunk switching means.

12. A telephone line concentrator system in accordance with claim 11 including in addition steering means, pulse source means, and means responsive to the reception of selected binary indicia indicative of the operation of said steering means for governing said steering means to control the delivery of pulses from said pulse source means to said line selector means and trunk selector means.

13. A telephone line concentrator system in accordance with claim 12 wherein said ferreed crosspoints include differentially wound ferreeds having horizontal and vertical windings thereon, wherein said horizontal windings of said ferreeds in said line switching means are connected to said horizontal windings of said ferreeds in said trunk switching means, wherein said vertical windings of said ferreeds in said line switching means are coupled to said line selector means, and wherein said vertical windings on said ferreeds in said trunk switching means are coupled to said trunk selector means.

14. A telephone line concentrator system in accordance with claim 13 including in addition line sensory means coupled to said lines, line cutoff means comprising ferreed means coupled to said lines and to said line sensory means, and additional means for coupling said line cutoff means to said line selector means.

15. A telephone line concentrator system in accordance with claim 14 wherein said line selector means includes relay means operable in response to binary signals representative of particular line identifications, wherein said trunk selector means includes relay means operable responsive to binary signals indicative of particular trunk identifications, and wherein said link selector means includes contacts of said relays in said line selector means.

References Cited by the Examiner

UNITED STATES PATENTS

| | | | |
|---|---|---|---|
| 3,070,666 | 12/1962 | Brooks et al. | 179—18.3 |
| 3,136,863 | 6/1964 | Melvin | 179—18.3 |
| 3,173,994 | 3/1965 | Prescher et al. | 179—15 |

KATHLEEN H. CLAFFY, *Primary Examiner.*

L. A. WRIGHT, *Assistant Examiner.*